(12) United States Patent
Kurokawa et al.

(10) Patent No.: US 7,468,819 B2
(45) Date of Patent: Dec. 23, 2008

(54) IMAGE READING APPARATUS AND TRANSMITTING ORIGINAL ILLUMINATING APPARATUS

(75) Inventors: Naho Kurokawa, Ibaraki (JP); Masaaki Onoda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 748 days.

(21) Appl. No.: 10/858,073

(22) Filed: Jun. 2, 2004

(65) Prior Publication Data

US 2004/0246543 A1    Dec. 9, 2004

(30) Foreign Application Priority Data

Jun. 4, 2003 (JP) ............................ 2003-159408
Jul. 31, 2003 (JP) ............................ 2003-205056

(51) Int. Cl.
*H04N 1/46* (2006.01)

(52) U.S. Cl. ..................... 358/506; 358/509; 358/487

(58) Field of Classification Search ................ 358/509, 358/506, 501, 401, 487, 1.1, 453; 355/18, 355/19, 33
See application file for complete search history.

(56) References Cited

U.S. PATENT DOCUMENTS

| | | | | |
|---|---|---|---|---|
| 5,754,314 A | * | 5/1998 | Araki et al. | 358/487 |
| 5,986,774 A | * | 11/1999 | Han | 358/506 |
| 5,995,204 A | * | 11/1999 | Hoshino et al. | 358/487 |
| 6,023,347 A | * | 2/2000 | Hoshino et al. | 358/506 |
| 6,049,375 A | * | 4/2000 | Tazawa et al. | 358/506 |
| 6,519,023 B1 | * | 2/2003 | Chang | 358/506 |
| 6,650,358 B1 | * | 11/2003 | Sawanobori | 358/453 |
| 7,099,055 B1 | * | 8/2006 | Fischer et al. | 358/487 |
| 2002/0135788 A1 | * | 9/2002 | Arakawa et al. | 358/1.1 |
| 2003/0202222 A1 | * | 10/2003 | Amimoto et al. | 358/487 |

FOREIGN PATENT DOCUMENTS

JP    2000-358132    12/2000
JP    2003-8835    1/2003

* cited by examiner

*Primary Examiner*—Twyler L Haskins
*Assistant Examiner*—Nicholas C Pachol
(74) *Attorney, Agent, or Firm*—Fitzpatrick, Cella, Harper & Scinto

(57) ABSTRACT

An image reading apparatus includes a transparent original table for placing a transmitting original thereon, an image reading unit for reading an image of the transmitting original through the transparent original table, and a transmitting original holder having a through-hole for positioning the transmitting original relative to the transparent original table. In addition, an illuminating unit is provided for pressing the transmitting original positioned by the through-hole of the original holder, and includes a plane light source for illuminating the transmitting original, a fitting portion for fitting in the through-hole, and a protruding portion protruding toward a direction along the surface of the transmitting original from a surface of the illumination unit. The protruding portion contacts with an upper surface of the transmitting original holder when the fitting portion fits and thus the transmitting original is pressed.

8 Claims, 15 Drawing Sheets

IMAGE READING APPARATUS AND TRANSMITTING ORIGINAL ILLUMINATING APPARATUS

BACKGROUND OF THE INVENTION

1. Field of the Invention

This invention relates to an image reading apparatus and an illuminating apparatus for irradiating transmitting original film on a transparent original table by a transmitting original illuminating unit, and reading an irradiated image by a reading sensor through the transparent original table.

2. Related Background Art

Heretofore, many image reading apparatuses for reading a transmitting original as described in Japanese Patent Application Laid-Open No. 2000-358132 have read an image formed by the imaging lens of a reduction optical system, by the use of a CCD image reading element, and the depth of field of the imaging lens has been deep. Therefore, even if transmitting original film has been more or less far from a transparent original table, the film could be read without any problem, and a film holder for holding down the end portions of the transmitting original film from a vertical direction has been placed on the transparent original table to thereby effect reading. In this case, there has been adopted a construction for illuminating the transmitting original film by the use of a light source contained in a pressure plate, and it has not happened that a plane light source contacts with the transmitting original film. Also, even when use is made of a compact light source as described in Japanese Patent Application Laid-Open No. 2003-008835, no consideration has been given to inadvertent contact of a light source with the depth of transmitting original film.

In recent years, however, with a view to thinning, downsizing and electric power saving of an image reading apparatus, there is an image reading apparatus using an original table contact type reading sensor having a one-to-one magnification imaging lens like a rod lens array. If an attempt is made to mount a transmitting original illuminating unit on such an apparatus to thereby read film, the upper and lower portions of the film cannot be held down by a film holder because the depth of field of the imaging lens is shallow, and thus the film is directly placed on a transparent original table glass. The transmitting original illuminating unit is disposed on it, but when saving the electric power of the image reading apparatus, it is sometimes the case that use is made of a transmitting original illuminating unit using a compact plane light source of a size of the order of one frame of transmitting original film. In this case, if the plane light source portion is not carefully installed so as to be parallel to the film, the corner of the end portion of the transmitting original illuminating unit has sometimes contacted with the film to thereby injure the film.

FIG. 17 of the accompanying drawings schematically shows the construction of a conventional image scanner. The reference numeral 1700 designates the image scanner having a CIS 1702 for scanning along an original glass table 1701 to read film (an original) F placed on the original glass table 1701, and in the CIS 1702, there are disposed a light source member for a reflecting original (not shown), a rod lens array (imaging means) 1703 and a line-shaped photoelectric conversion element 1704. The reference numeral 1705 denotes a film adapter unit (hereinafter referred to as the FAU) comprised of a plane light source member 1706 and a film holder 1707. The plane light source member 1706 has a light source 1709 provided in a plane light source member housing 1708, and a diffusing plate 1710 provided so as to close the underside opening portion of the housing 1708.

When the image of 35 mm photographic film as a transmitting original is to be read, there has further been the following problem. The 35 mm photographic film (hereinafter referred to as the "film F"), as shown in FIG. 16 of the accompanying drawings, has read image areas Fa (dots-and-dash line portions in FIG. 16 of the accompanying drawings) and a non-read image area Fb, and is provided with a plurality of through-holes (hereinafter referred to as the perforations) P located in the non-read image areas Fb and located on the widthwisely opposite sides of the film F and formed in rows in the longitudinal direction of the film F. Feeding gears provided in a camera are engaged with these perforations P so that the film F may be sequentially fed. Here, the spacing between the perforations P on one side in the widthwise direction of the film F and the perforations P on the other side is defined as l.

The read image may sometimes be deteriorated according to such a positional relation between the film F and the line-shaped photoelectric conversion element 1704. The deterioration of the read image will now be described with reference to FIGS. 18 to 23 of the accompanying drawings.

FIG. 18 is a schematic plan view of the image scanner 1700 when the longitudinal direction of the film F and the longitudinal direction of the line-shaped photoelectric conversion element 1704 are made coincident with each other, FIG. 19 is an enlarged view of the film F portion of FIG. 18, FIG. 20 is a cross-sectional view taken along the line 20-20 of FIG. 19, FIG. 21 is a schematic plan view of the image scanner 1700 when the longitudinal direction of the film F and the longitudinal direction of the line-shaped photoelectric conversion element 1704 are made orthogonal to each other, FIG. 22 is an enlarged view of the film F portion of FIG. 21, and FIG. 22 is a cross-sectional view taken along the line 23-23 of FIG. 22.

When the image of the film F is to be read with the longitudinal direction of the film F and the longitudinal direction of the line-shaped photoelectric conversion element 1704 made coincident with each other (when a dots-and-dash line 2500 in FIGS. 18 and 19 is a main scan reading line), light from the light source 1709, as shown in FIG. 20, uniformly passes through the film F including the vicinity of the read image areas Fa to the line-shaped photoelectric conversion element 1704 and therefore, does not adversely affect the image.

However, when the image of the film F is to be read with the longitudinal direction of the film F and the longitudinal direction of the line-shaped photoelectric conversion element 1704 made orthogonal to each other (when a dots-and-dash line 2800 in FIGS. 21 and 22 is a main scan reading line), the light from the light source 1709, as shown in FIG. 23, directly enters from the perforations P in the non-read image area Fb, and diffused light when direct light of a high level enters the rod lens array 1703, etc. arrives at the line-shaped photoelectric conversion element 1704, and as the result, in some cases, it adversely affects the read image near the perforations P.

The line-shaped photoelectric conversion element 1704 has a full length of the order of 220 mm, but is not comprised of a single sensor chip, but is comprised of a plurality of sensor chips of the order of 30 mm-40 mm arranged in a line shape. When the plurality of sensor chips are arranged in a line shape, there is a case where from the problem of assembly accuracy, each sensor chip does not become a straight line in the order of micron, or a case where the pitch of the photoelectric conversion element widens among the chips, so that there is a case where image deterioration called an inter-chip level difference occurs. Therefore, to avoid among the chips and read the above-described film by one chip, there is adopted a construction in which the image of the film F is read with the longitudinal direction of the film F and the longitudinal direction of the line-shaped photoelectric conversion element 1704 made orthogonal to each other, and this leads to the possibility of adversely affecting the read image near the above-described perforations P.

SUMMARY OF THE INVENTION

To solve the above-noted problem, an apparatus for reading images according to the present invention is constituted as follows.

[1] An image reading apparatus including: a transparent original table for placing a transmitting original thereon; an image reading unit for reading the image of the transmitting original through the transparent original table; a transmitting original holder having a through-hole for positioning the transmitting original relative to the transparent original table; and an illuminating unit adapted for pressing the transmitting original positioned by the through-hole of the original holder, including a plane light source for illuminating the transmitting original, and comprising a fitting portion for fitting in the through-hole, and a protruding portion protruding toward a direction along the surface of the transmitting original from a side surface of said illumination unit, said protruding portion contacting with an upper surface of the transmitting original holder when the fitting portion fits and thus the transmitting original is pressed, wherein when the transmitting original illuminating unit is inserted into the through-hole of the transmitting original holder at an angle at which the surface having the plane light source is not parallel to the transparent original table, the protruding portion of the transmitting original illuminating unit first contacts with the upper surface of the transmitting original holder.

[2] The image reading apparatus described in [1], wherein the protruding portion is a cable for supplying a power source to the plane light source.

[3] A transmitting original illuminating apparatus placed on the transparent original table of an image reading apparatus, including: a transmitting original holder having a through-hole for positioning a transmitting original relative to the transmitting original table; and an illuminating unit adapted for pressing the transmitting original positioned by the through-hole of the original holder, including a plane light source for illuminating the transmitting original, and comprising a fitting portion for fitting in the through-hole, and a protruding portion protruding toward a direction along the surface of the transmitting original from a side surface of said illumination unit, said protruding portion contacting with an upper surface of the transmitting original holder when the fitting portion fits and thus the transmitting original is pressed, wherein when the transmitting original illuminating unit is inserted into the through-hole of the transmitting original holder at an angle at which the surface having the plane light source is not parallel to the transparent original table, the protruding portion of the transmitting original illuminating unit first contacts with the upper surface of the transmitting original holder.

[4] The image reading apparatus described in [1], wherein the transmitting original has an image area and a non-image area, the non-image area has a plurality of through-holes arranged in two rows in the lengthwise direction thereof with the image area interposed therebetween, and the plane light source of the transmitting original illuminating unit has a shape in which it illuminates the image area of the transmitting original, but does not illuminate the plurality of through-holes.

[5] The image reading apparatus described in [4], wherein the light emitting area of the plane light source of the transparent original illuminating unit is of an area shape which includes the image area, but does not include the through holes.

[6] The image reading apparatus described in [4], wherein the light emitting surface of the plane light source of the transmitting original illuminating unit has a rectangular diffusing plate, and the shorter sides of the diffusing plate are smaller than the spacing between the two rows of the plurality of through-holes.

[7] The image reading apparatus described in [4], wherein the light emitting surface of the plane light source of the transmitting original illuminating unit has a light-intercepting plate formed with a hole having two parallel sides, and the spacing between the two parallel sides is smaller than the spacing between the two rows of the plurality of through-holes.

[8] The image reading apparatus described in [7], wherein the width of the through-hole of the transmitting original holder is smaller than the spacing between the two rows of the plurality of through-holes.

DESCRIPTION OF THE PREFERRED EMBODIMENTS

Some embodiments of the present invention will hereinafter be described in detail with reference to the drawings.

(First Embodiment)

Figure 8:
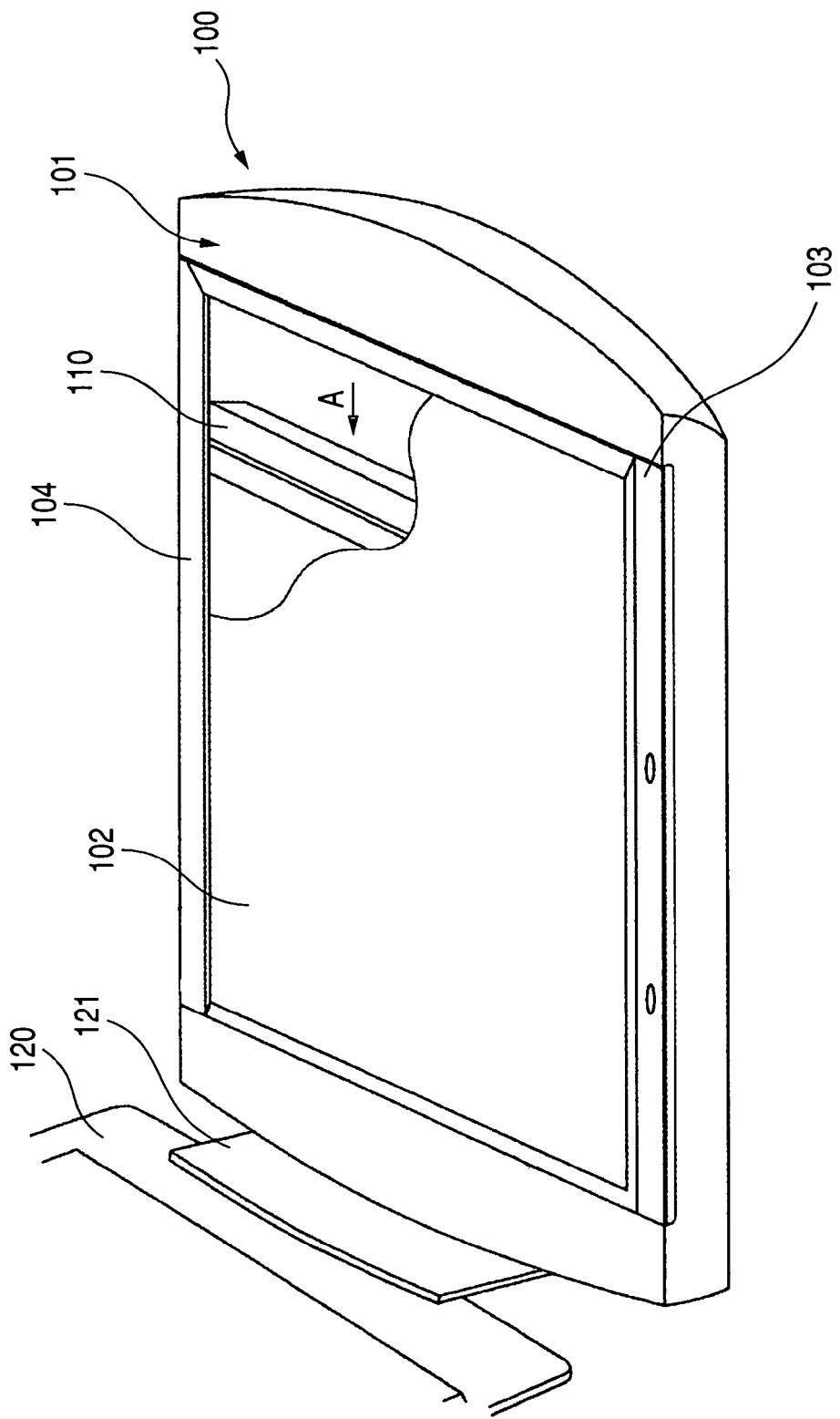
FIG. 8 shows the image reading apparatus main body.

FIG. 8 shows an image reading apparatus main body in a first embodiment of the present invention. In FIG. 8, the reference numeral 100 designates the image reading apparatus main body, the reference numeral 101 denotes a base frame, the reference numeral 102 designates an original glass table, the reference numerals 103 and 104 denote glass mounting frames, the reference numeral 110 designates an original table contact type sensor, the reference numeral 120 denotes a pressure plate, and the reference numeral 121 designates the hinge of the pressure plate which can be used with a reflecting original reading mode and a transmitting original reading mode changed over.

During the reflecting original reading mode, a user places an original on the original glass table 102, and closes the pressure plate 120. When the user depresses the start button of a personal computer (not shown), the original table contact type sensor 110 is moved in the direction of arrow A while turning on R, G and B LEDS contained therein, and reads a reflected image by a photoelectric conversion element array contained therein, and converts it into an electrical signal and forwards it to the personal computer.

The time of the transmitting original reading mode will now be described with reference to FIG. 1 to FIG. 6 in the named order.

Figure 1:
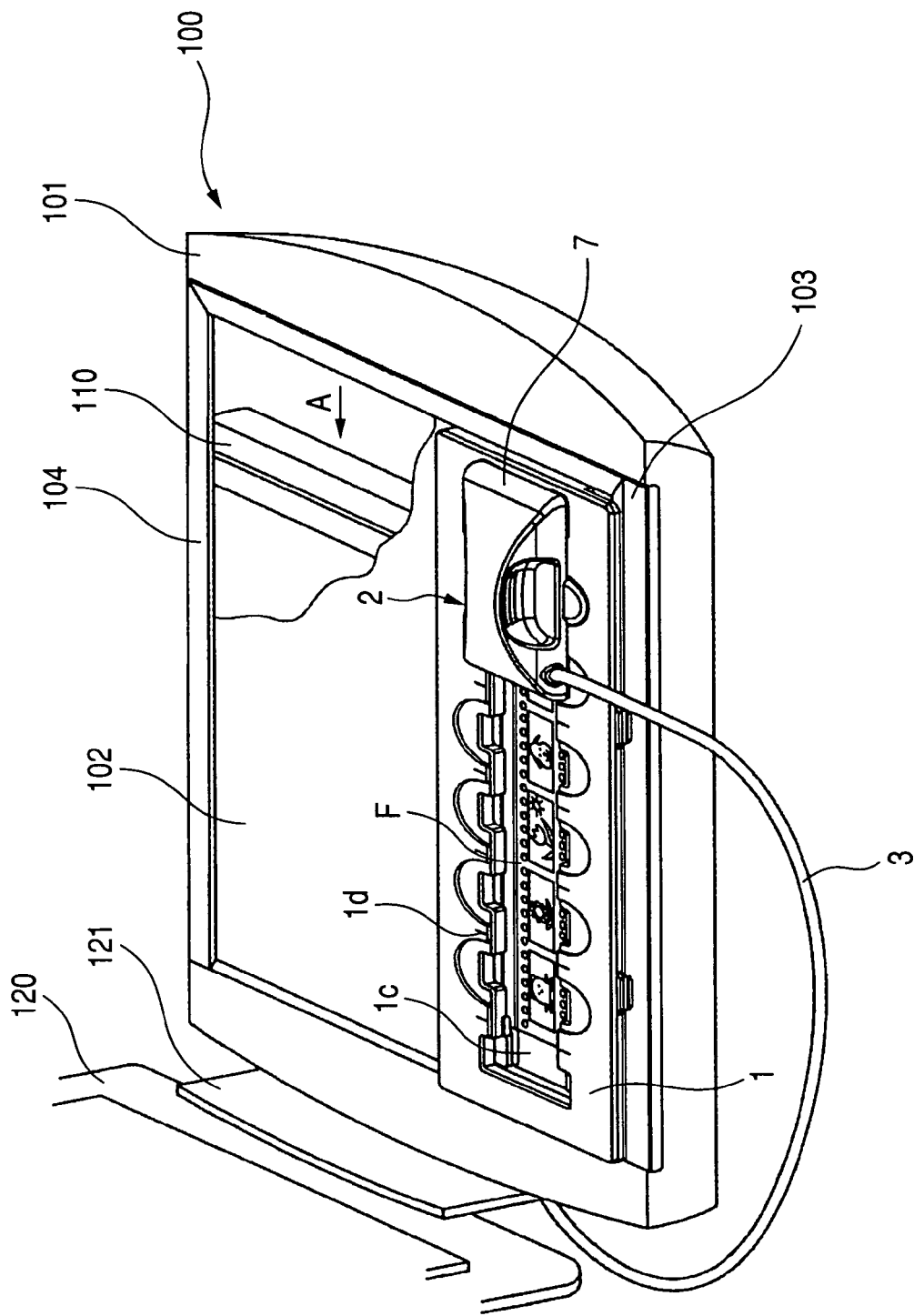
FIG. 1 is a perspective view of the transmitting original reading apparatus of the present invention.

FIG. 1 is a perspective view showing a case where a transmitting original is read by the image reading apparatus of the present invention. In FIG. 1, the reference numeral 1 denotes a film holder installed on the original glass table 162, and having a hole 1c for positioning film F therein. The reference numeral 2 designates a transmitting original illuminating unit mounted on the film F positioned by the film holder and in the hole 1c of the film holder.

Figure 2:
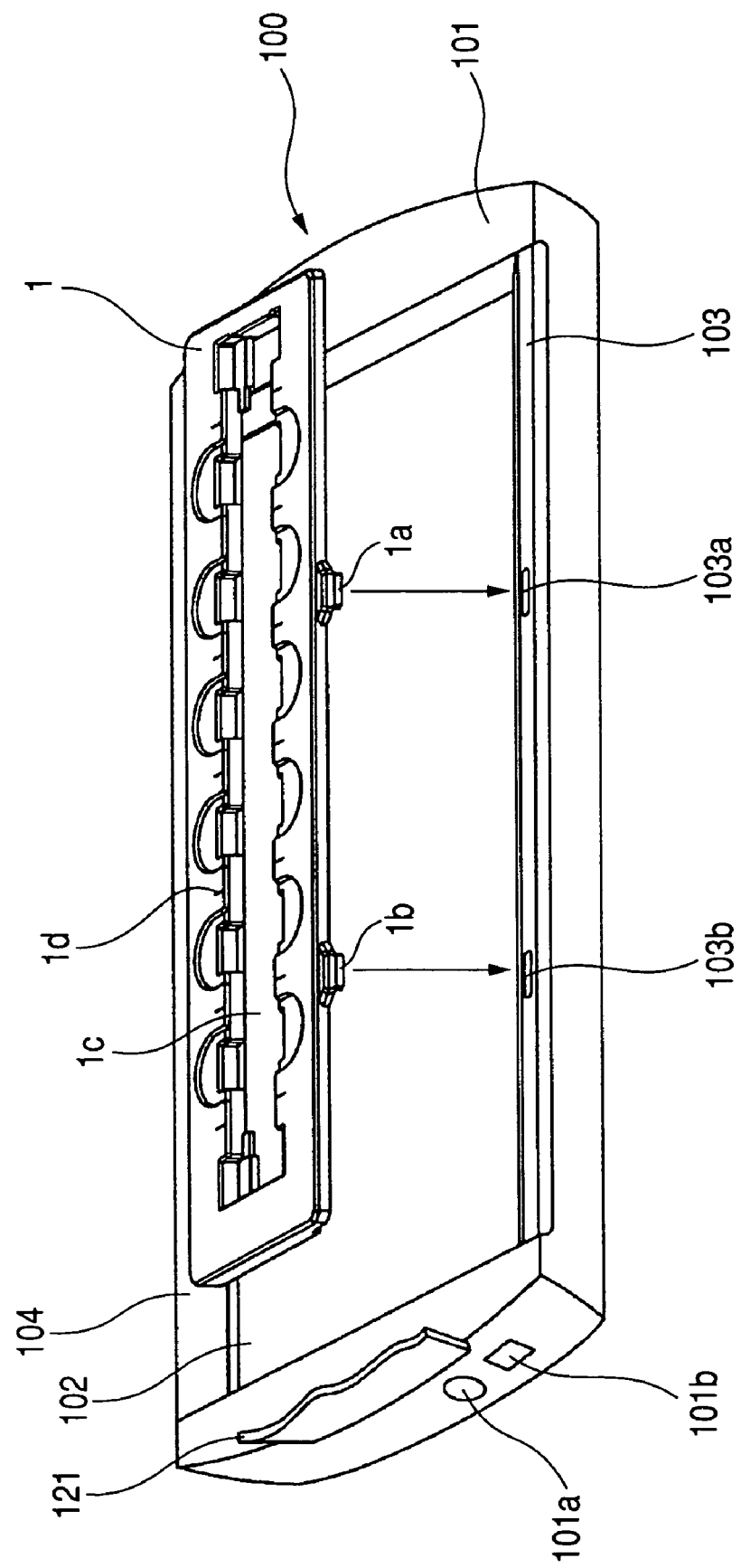
FIG. 2 shows the manner in which a transmitting original holder is fitted into an image reading apparatus main body.

FIG. 2 shows the manner in which the film holder 1 is mounted on the image reading apparatus main body 100. The user fits claws 1a and 1b formed on the film holder into the depressions 103a and 103b, respectively, of the glass mounting frame, and positions them in a direction parallel to the original glass table relative to the image reading apparatus main body 100. The film holder 1 rides on the original glass table 102 from gravity, whereby the vertical direction thereof is positioned.

Figure 3:
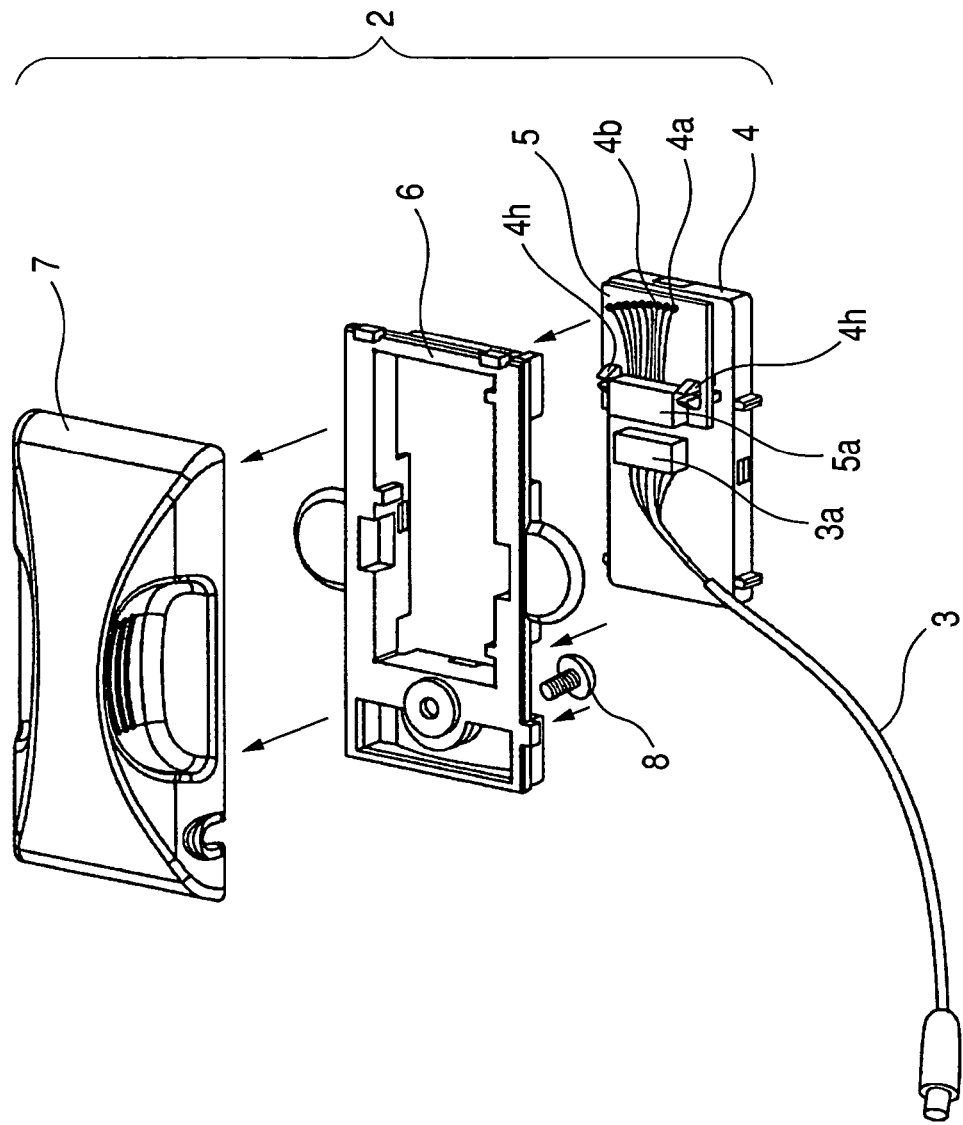
FIG. 3 is a detailed view of a transmitting original illuminating unit.

FIG. 3 is a developed view of the transmitting original illuminating unit 2. The reference numeral 4 designates a plane light source member containing R, G and B and infrared LEDS therein. The terminals 4a, 4b, . . . of the LEDS are soldered to the pattern of a substrate 5 and are connected to a connector 5a on the substrate 5. The substrate 5 is fixed by the claw portion 4b of the plane light source member 4. The plane light source member 4 is inserted in a base bed 6 and fixed thereto. The connector portion 3a of a cable 3 is fitted in the connector 5a on the substrate, and a cover 7 is fixed to the base bed 6 by a screw 8.

Figure 4:
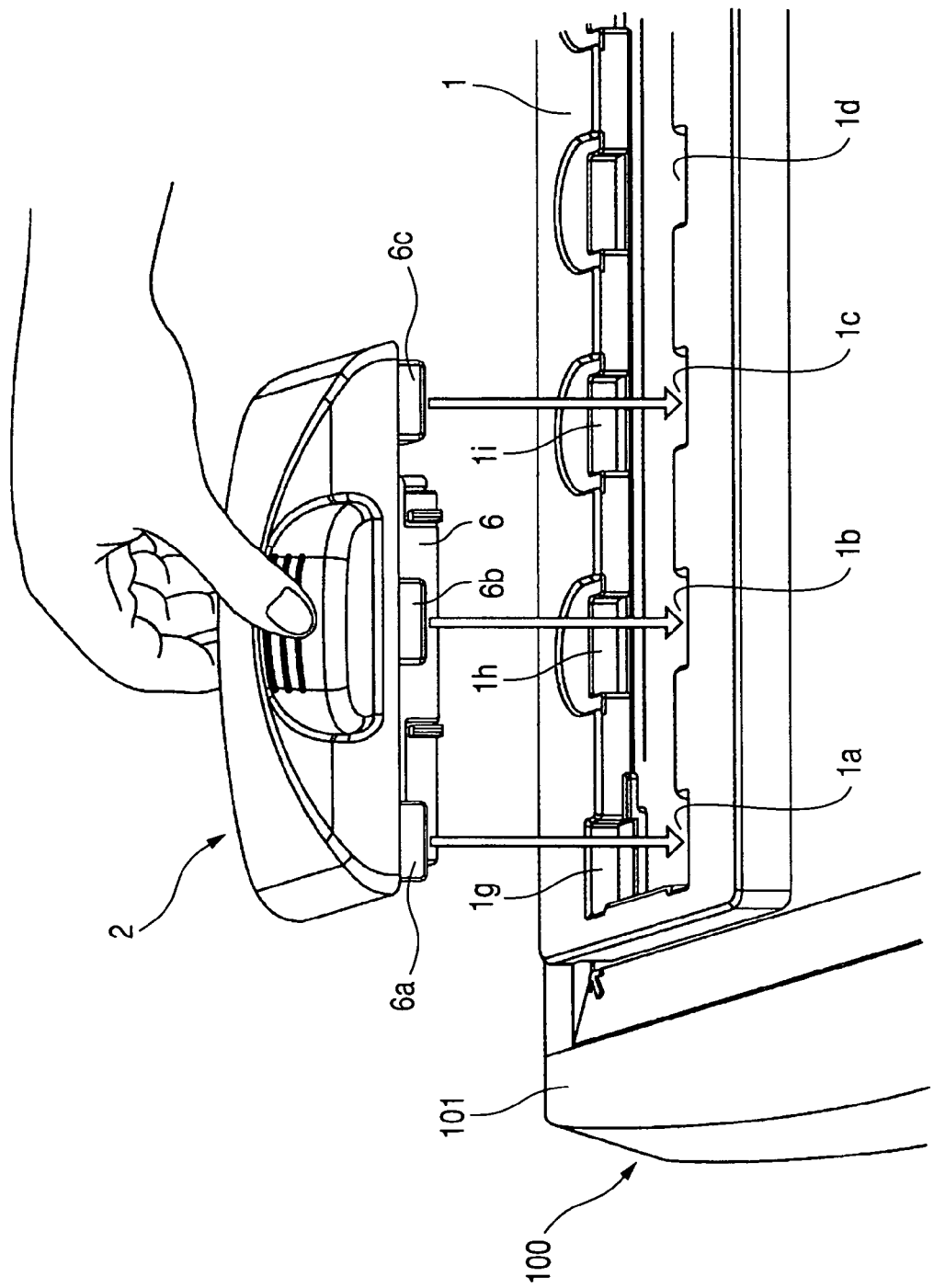
FIG. 4 shows the manner in which the transmitting original illuminating unit is fitted into the transmitting original holder.
Figure 5:
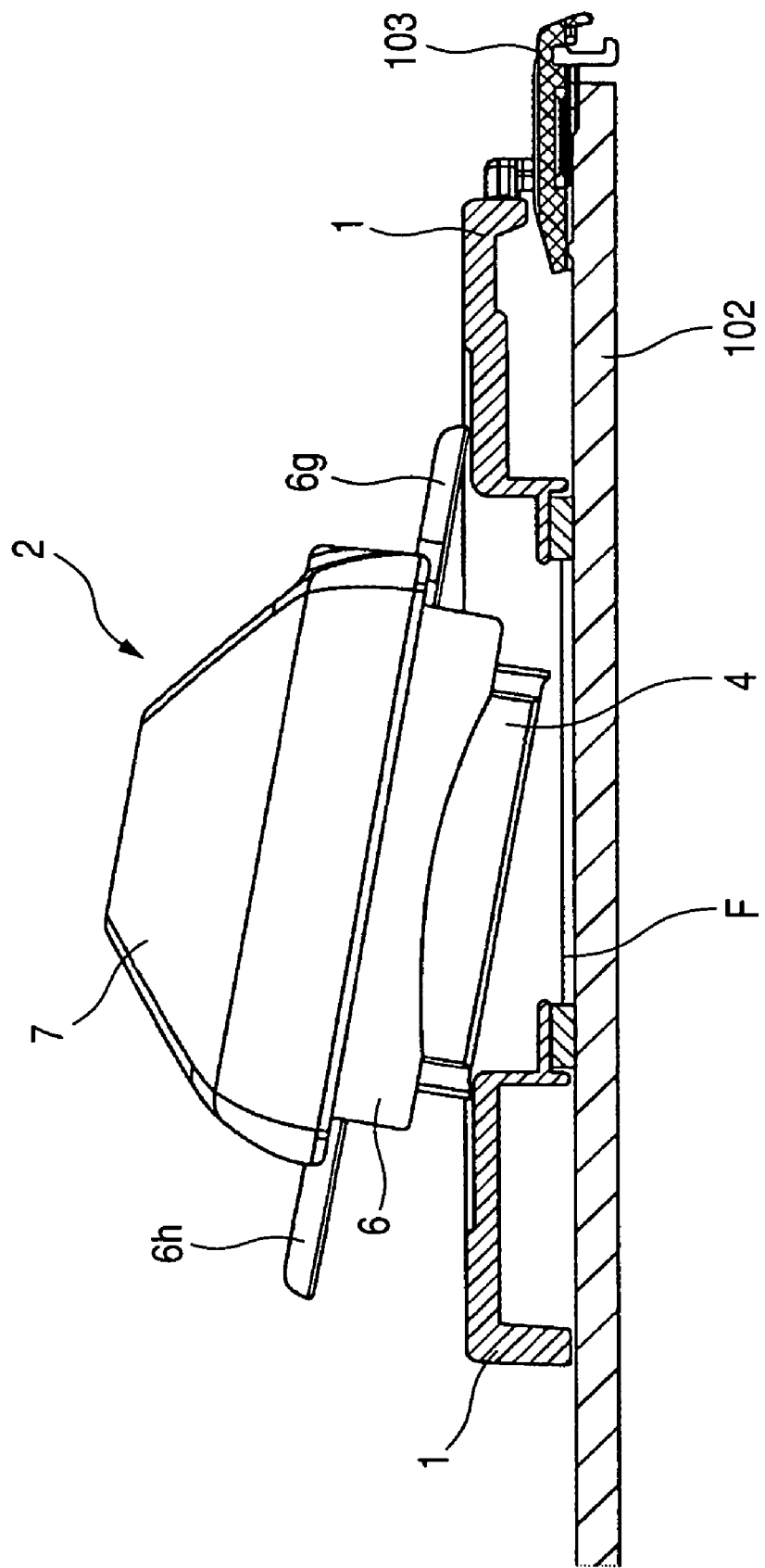
FIG. 5 shows the manner in which the transmitting original illuminating unit is obliquely inserted into the transmitting original holder.
Figure 6:
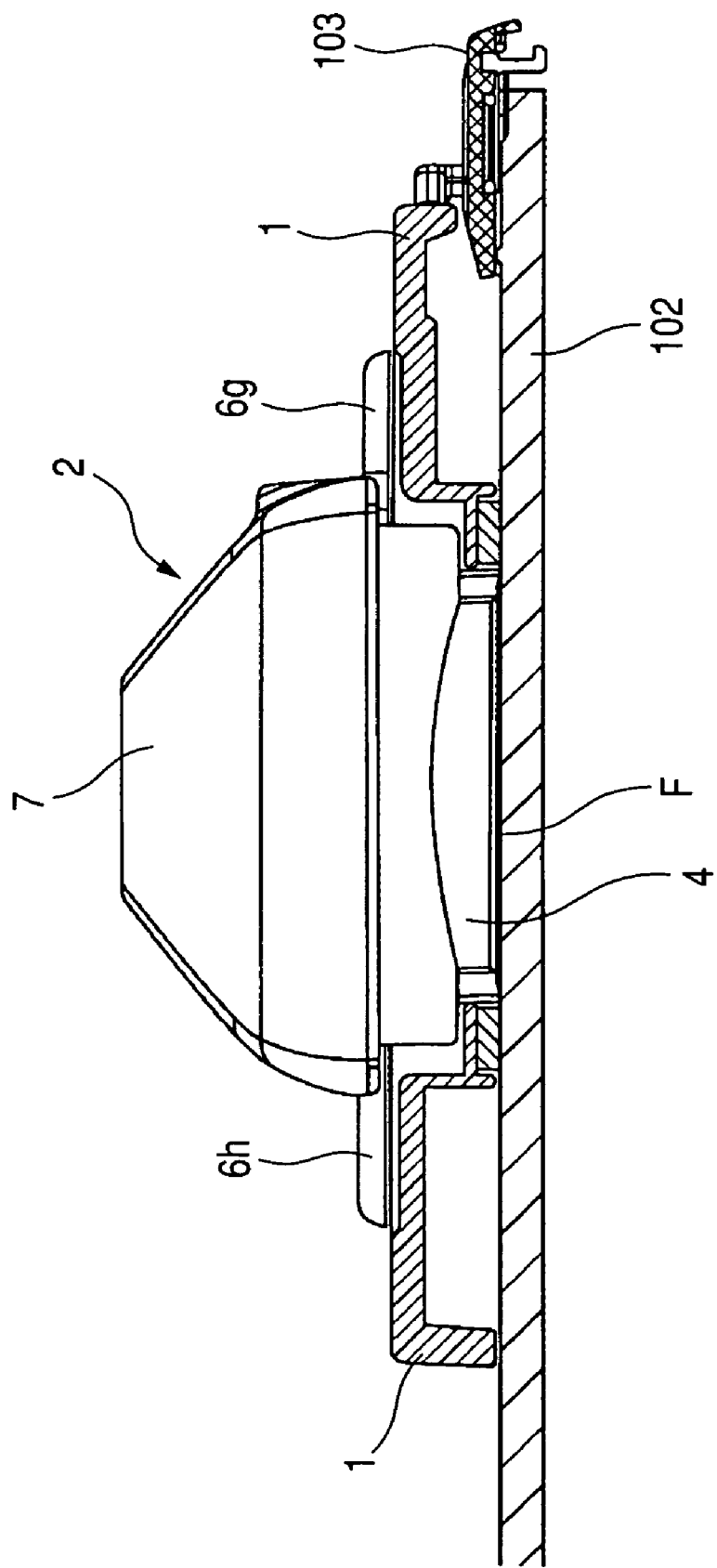
FIG. 6 shows the transmitting original illuminating unit as it has been installed at a correct position.

The user, as previously described, positions the film holder 1 on the image reading apparatus main body 100, and thereafter, as shown in FIG. 1, inserts the film F into the hole portion 1c of the film holder 1, and positions the film with the frames of the film registered with a positioning index 1d. The cable 3 of the transmitting original illuminating unit 2 is connected to the connector 101a of the image reading apparatus main body 100 shown in FIG. 2. Next, the user, as shown in FIG. 4 (a protruding portion 6g being not shown), fits the protruding portions 6a, 6b and 6c of the base bed 6 of the transmitting original illuminating unit 2 into the depressions 1a, 1b and 1c, respectively, of a film guide. FIG. 5 shows a cross section of the film in the widthwise direction thereof, and when as shown in FIG. 5, the user obliquely inserts the transmitting original illuminating unit 2, the protruding portion 6g of the base bed 6 strikes against the upper surface of the film holder 1, and is stopped before the end portion of the plane light source 4 strikes against the film F. Therefore, even if the user obliquely inserts the transmitting original illuminating unit by mistake, the end portion of the plane light source does not injure the film. The protruding portion is attached to each side and therefore, even when the illuminating unit is inclined in an opposite direction, there is a protruding portion on the opposed side and thus, there is a similar effect. The user makes the plane light source of the transmitting original illuminating unit parallel to the original glass table and re-inserts the film holder 1, and the transmitting original illuminating unit is positioned at a regular position, as shown in FIG. 6. At this regular position, the protruding portions 6g, 6h contact with an upper surface of the film holder 1.

When the user depresses the start button on the personal computer, the original table contact type sensor 110 contained in the image reading apparatus main body 100, as shown in FIG. 1, is not turned on, but scans in the direction of arrow A, and the R, G and B LEDS of the plane light source 4 are successive turned on in synchronism with the scanning of the sensor 110, and an image irradiated by the plane light source 4 is read and forwarded to the personal computer.

(Second Embodiment)

Figure 7:
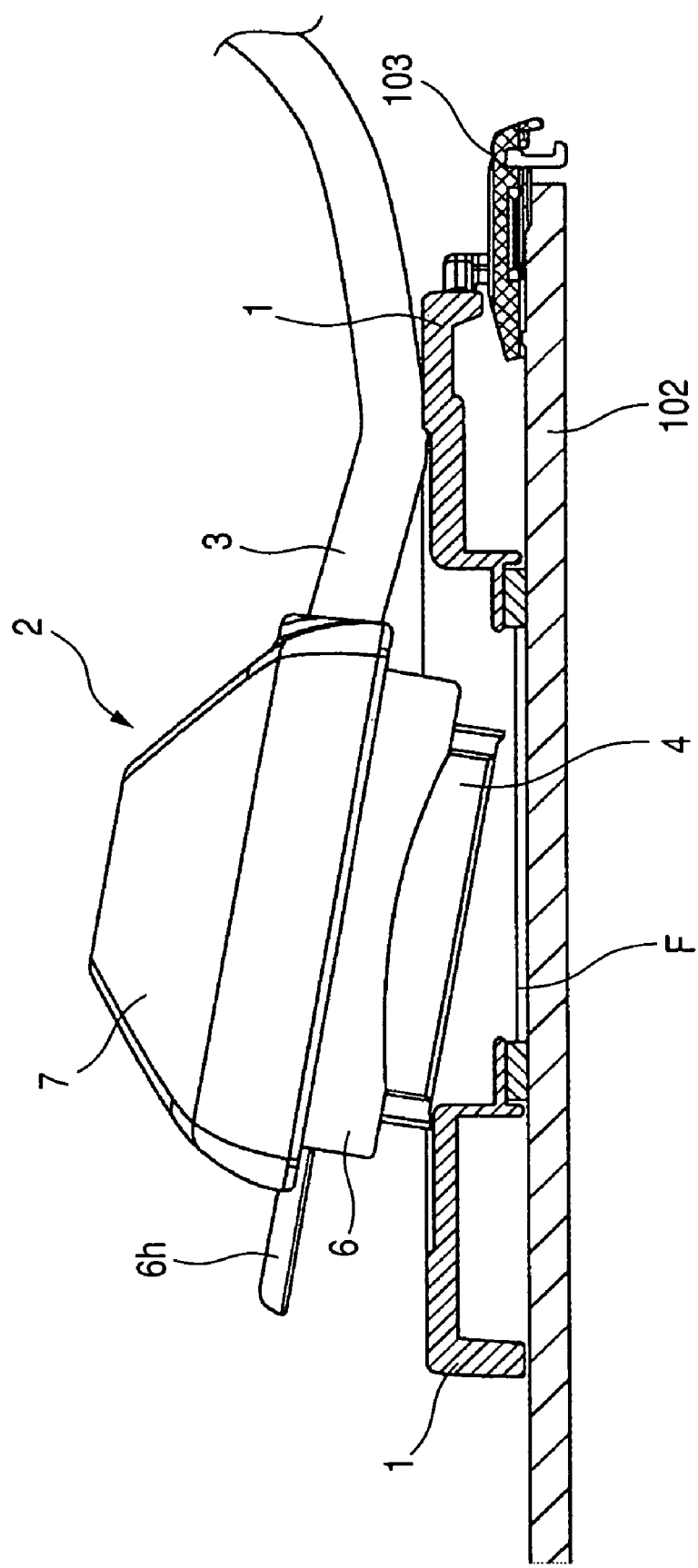
FIG. 7 shows a second embodiment of the present invention.

FIG. 7 shows an embodiment in which a cable connected to the image reading apparatus main body is used also as one of the protruding portions of the transmitting original illuminating unit. If the transmitting original illuminating unit is obliquely inserted with the cable side thereof underlying, the cable strikes against the upper surface of the film holder and the end portion of the plane light source can be prevented from striking against the film, and the film can be prevented from being injured.

(Third Embodiment)

A third embodiment of the present invention will now be described with reference to FIG. 9.

Figure 9:
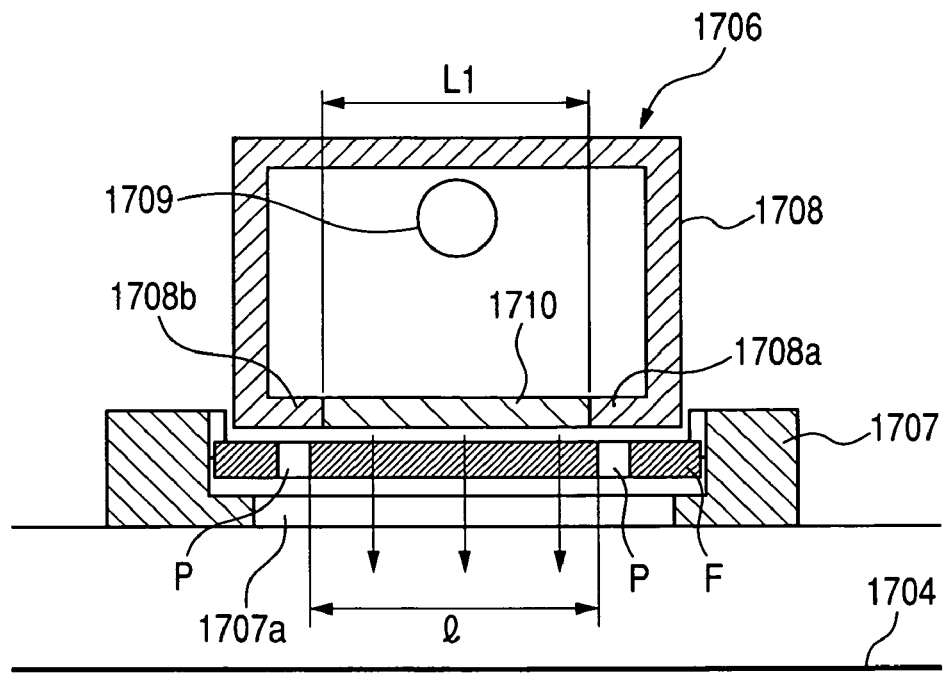
FIG. 9 is a cross-sectional view illustrating a third embodiment of the present invention.

FIG. 9 is a cross-sectional view showing the construction of the essential portions of an image reading apparatus according to the third embodiment, and in FIG. 9, the same portions as the portions in FIGS. 16 to 22 showing the above-described conventional example are given the same reference numerals. Also, in the drawings illustrating the following third to seventh embodiments, in order to illustrate the plane light source member 4 of the transmitting original illuminating unit 2 in detail, the protruding portions 6g and 6h of the transmitting original illuminating unit 2 are not shown, but there is no difference in having portions corresponding to the protruding portions 6g and 6h of FIG. 5. The plane light source member 4 will hereinafter be designated by the reference numeral 1706 in accordance with FIG. 17.

Also, in FIG. 9, the film F which is the original is exaggeratedly depicted. Also, there is a gap between the film F and the underside of the plane light source member 1706, but actually the film F and the underside of the plane light source member 1706 are in close contact with each other and are disposed in the film holder 1707 in that state.

The width L1 of a diffusing plate 1710 is set to a value smaller than the distance l between the perforations P and P on the widthwisely opposite sides of the film F (L1<l), whereby the perforations P and P of the film F become covered with a portion 1708a of a housing 1708 which is adjacent to the bottom surface side thereof, and thus, light from a light source 1709 does not directly reach a line-shaped photoelectric conversion element 1704 through the perforations P and P of the film F and therefore, a read image is not deteriorated.

(Fourth Embodiment)

Figure 10:
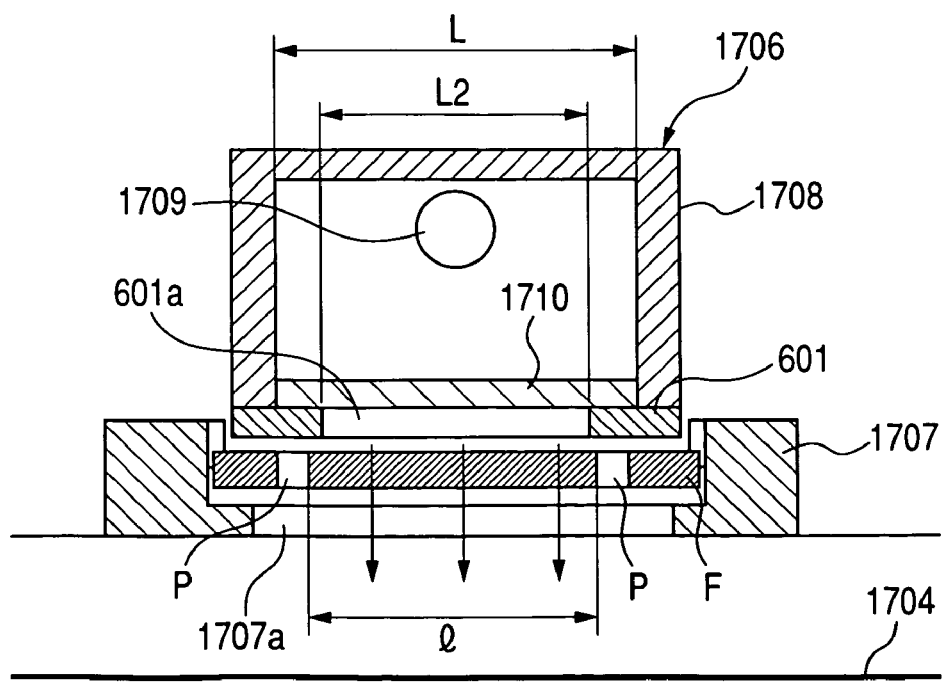
FIG. 10 is a cross-sectional view illustrating a fourth embodiment of the present invention.

A fourth embodiment shown in FIG. 10 is designed to cope with a case where the width L of the diffusing plate 1710 is greater than the distance l between the perforations P and P on the widthwisely opposite sides of the film F (L>l), and the perforations P and P of the film F are covered with a light intercepting member 601 formed of a plate material. The light intercepting member 601 is of a square frame shape having a rectangular opening portion 601a in the central portion thereof, and the width L2 of this opening portion 601a is set to a value smaller than the distance l between the perforations P and P on the widthwisely opposite sides of the film F (L2<l).

(Fifth Embodiment)

Figure 11:
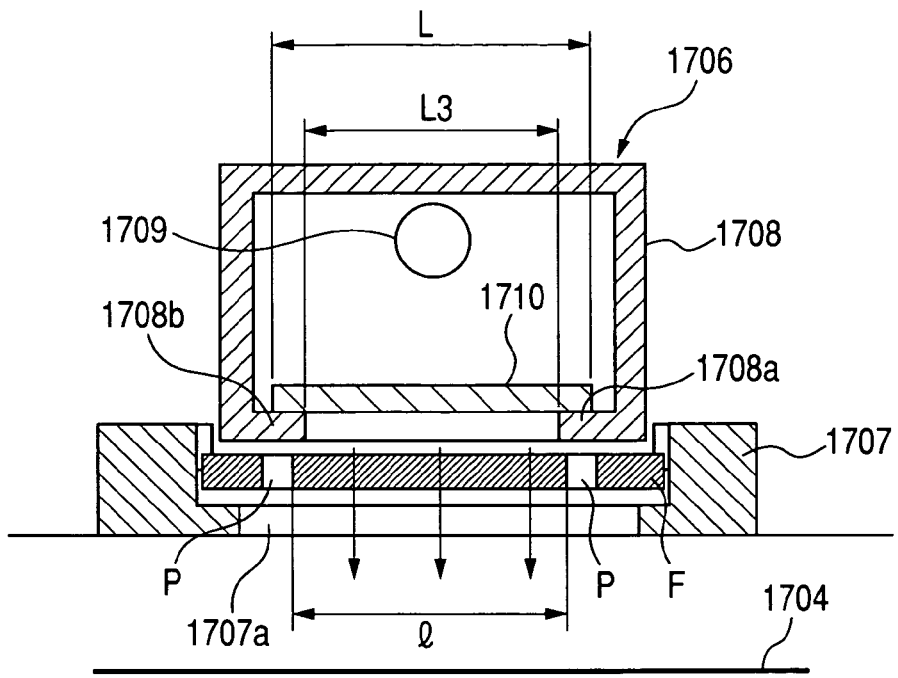
FIG. 11 is a cross-sectional view illustrating a fifth embodiment of the present invention.

A fifth embodiment shown in FIG. 11, like the above-described fourth embodiment, is designed to cope with a case where the width L of the diffusing plate 1710 is greater than the distance l between the perforations P and P on the widthwisely opposite sides of the film F (L>l), and the perforations P and P of the film F are covered with a holding portion for holding the diffusing plate 1710, whereby the light from the light source 1709 does not directly reach the line-shaped photoelectric conversion element 1704 through the perforations P and P of the film F. The opposite side edges of the diffusing plate 1710 are held and fixed on holding portions 1708a and 1708b located on the opposite sides of the underside of the housing 1708 of the plane light source member 1706 and provided toward the inside so as to be opposed to each other with a spacing L3 interposed therebetween. The spacing L3 between these holding portions 1708a and 1708b is set to a value smaller than the distance l between the perforations P and P on the widthwisely opposite sides of the film F (L3<l).

(Sixth Embodiment)

Figure 12:
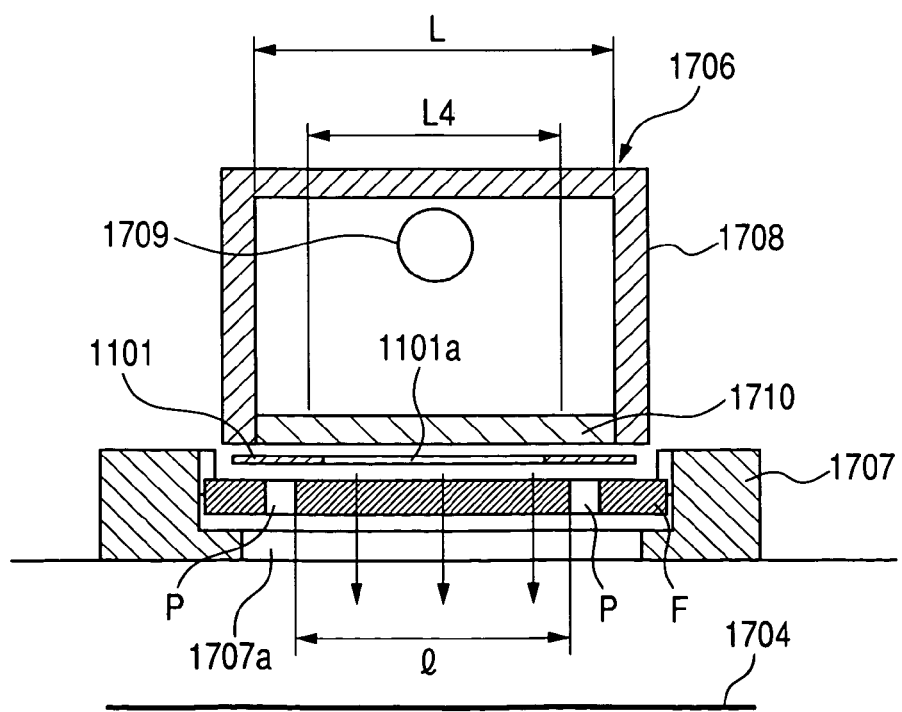
FIG. 12 is a cross-sectional view illustrating a sixth embodiment of the present invention.

A sixth embodiment shown in FIG. 12, like the above-described fourth and fifth embodiments, is designed to cope with a case where the width L of the diffusing plate 1710 is greater than the distance l between the perforations P and P on the widthwisely opposite sides of the film F (L>l), and the perforations P and P of the film F are covered with a light intercepting member 1101 formed of a sheet material, whereby the light from the light source 1709 does not directly reach the line-shaped photoelectric conversion element 1704 through the perforations P of the film F. The light intercepting member 1101 is formed of a square sheet material, and the plane shape thereof is set to a shape similar to but somewhat smaller than the plane shape of the housing 1708 of the plane light source member 1706, and forms a square frame shape having a rectangular opening portion 1101a in the central portion thereof. The width L4 of this opening portion 1101a is set to a value smaller than the distance l between the perforations P and P on the widthwisely opposite side of the film F (L4<l).

Figure 13:
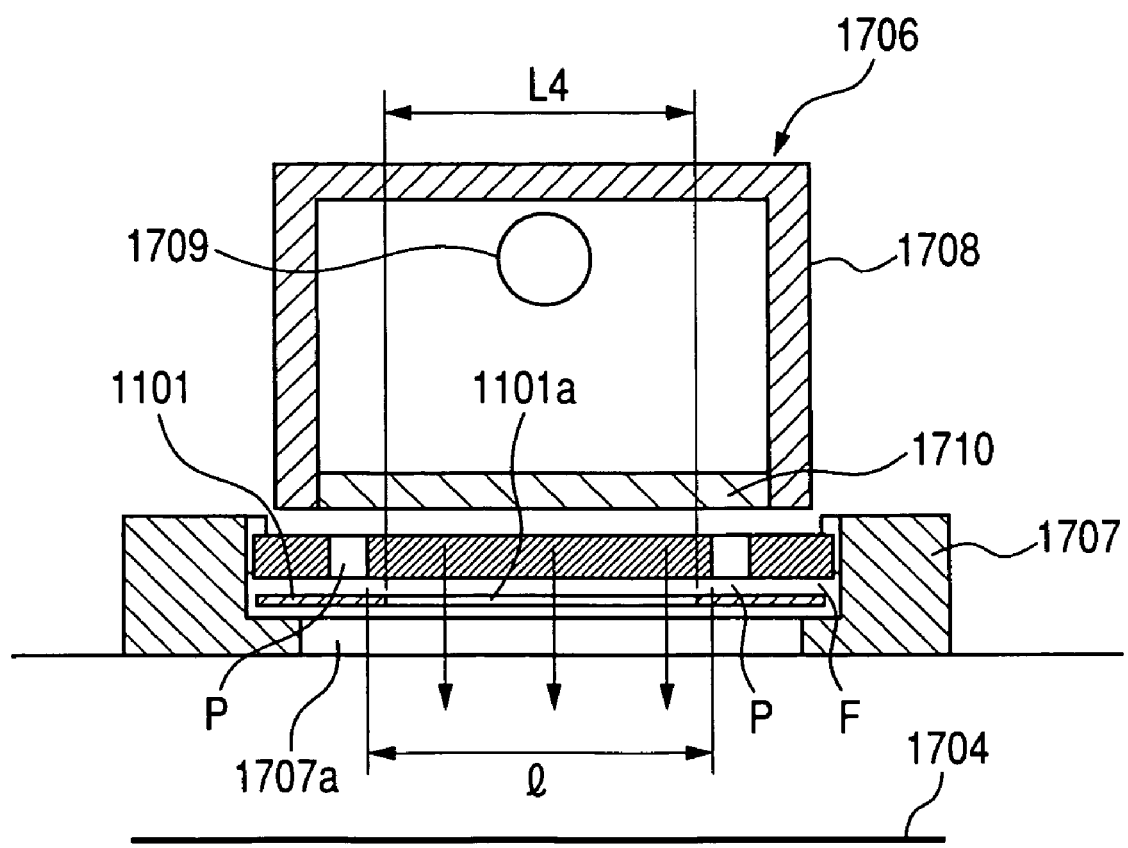
FIG. 13 is another cross-sectional view illustrating the sixth embodiment.

Also, as shown in FIG. 13, the light intercepting member 1101 may be interposed under the film F to obtain a similar effect.

(Seventh Embodiment)

Figure 14:
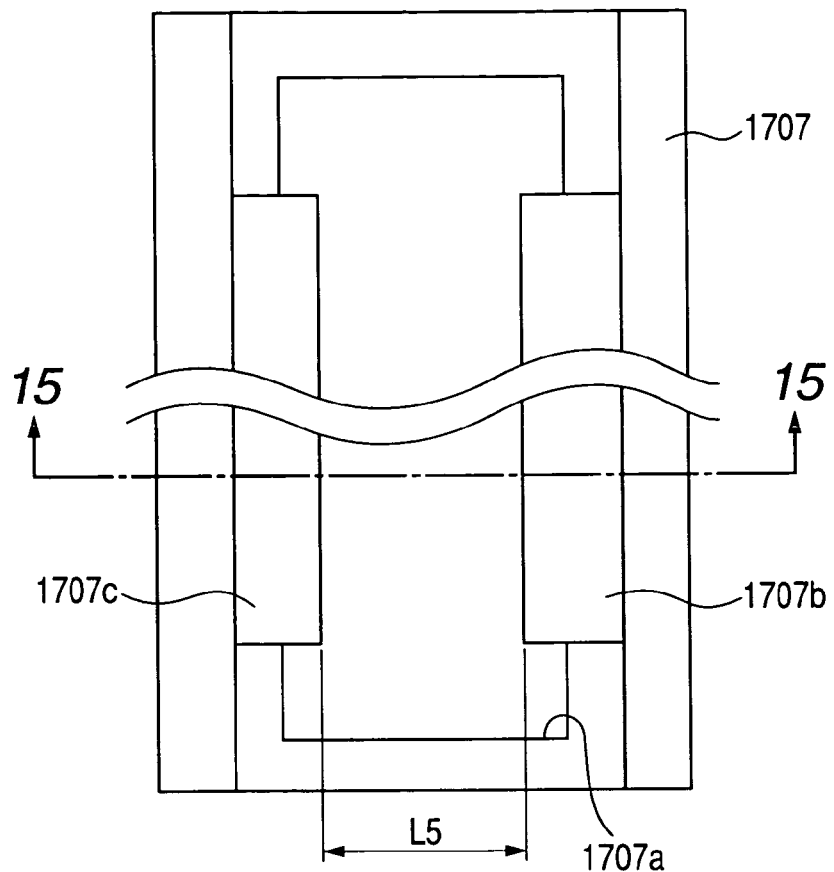
FIG. 14 is a plan view of a film holder illustrating a seventh embodiment of the present invention.
Figure 15:
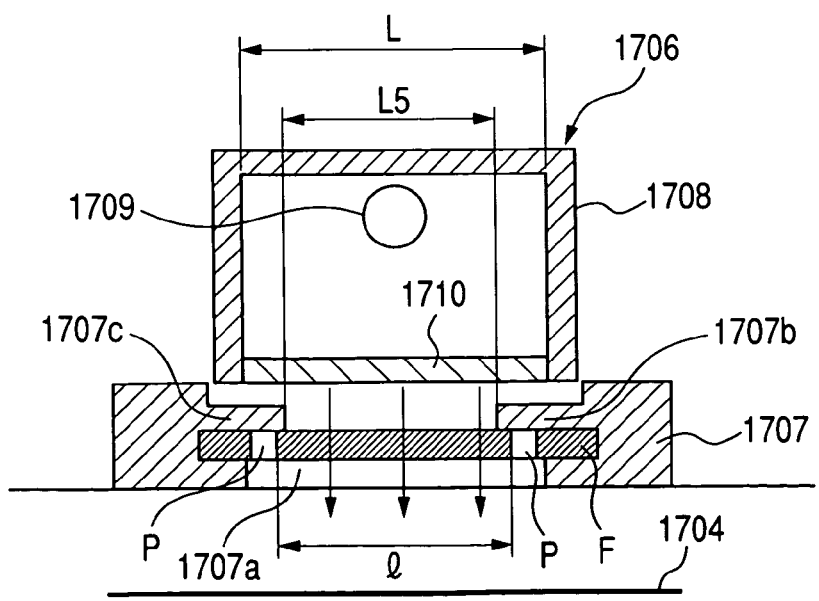
FIG. 15 is a cross-sectional view illustrating the seventh embodiment, taken along the line 15-15 of FIG. 14.
Figure 16:
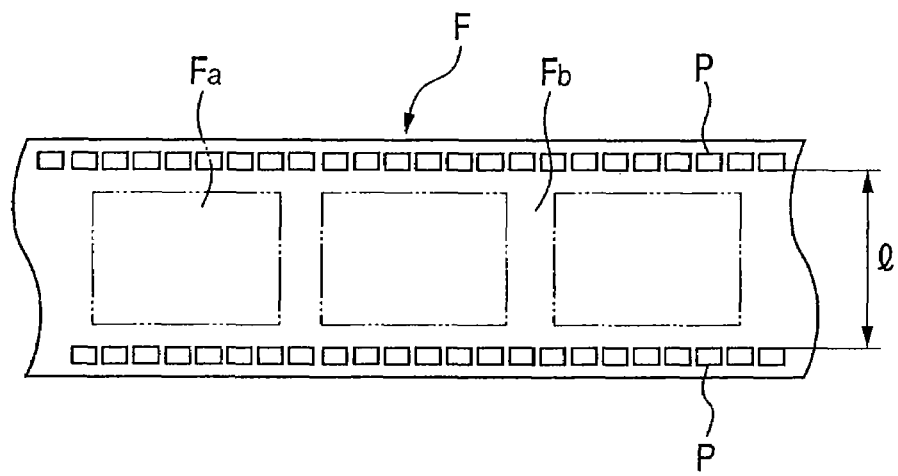
FIG. 16 is a fragmentary enlarged plan view of 35 mm film which is a transmitting original.
Figure 17:
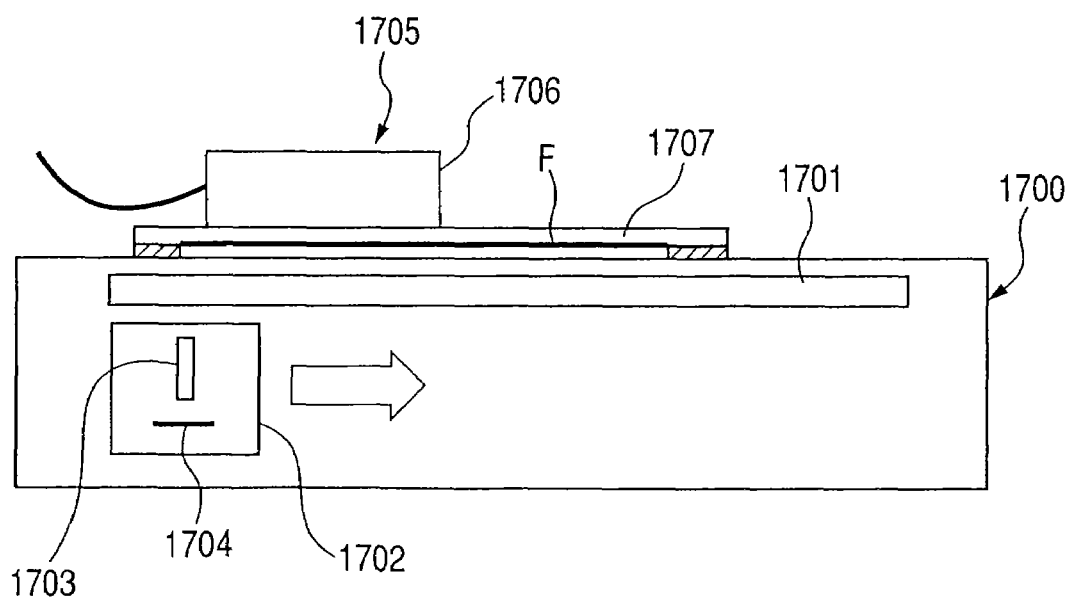
FIG. 17 is a side view showing the construction of a conventional image reading apparatus.
Figure 18:
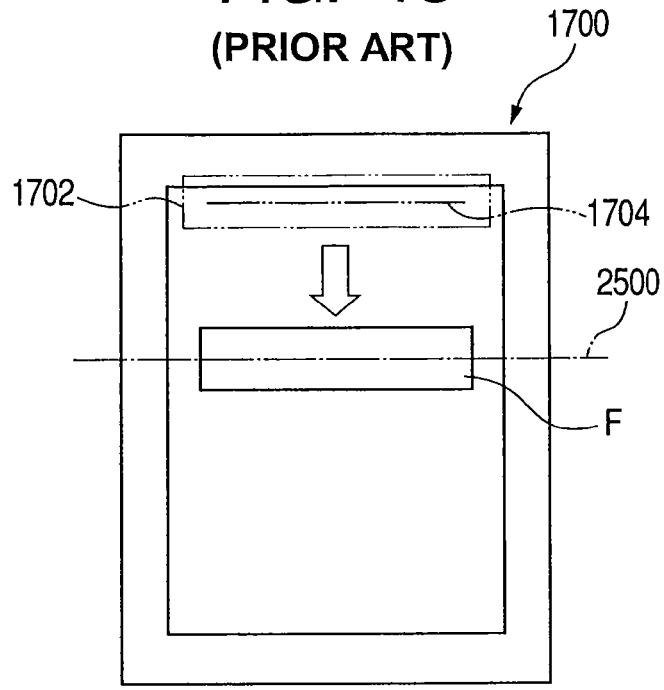
FIG. 18 is a plan view of essential portions showing a state in which in the conventional image reading apparatus, the longitudinal direction of film and the longitudinal direction of a line-shaped photoelectric conversion element are made orthogonal to each other.
Figure 19:
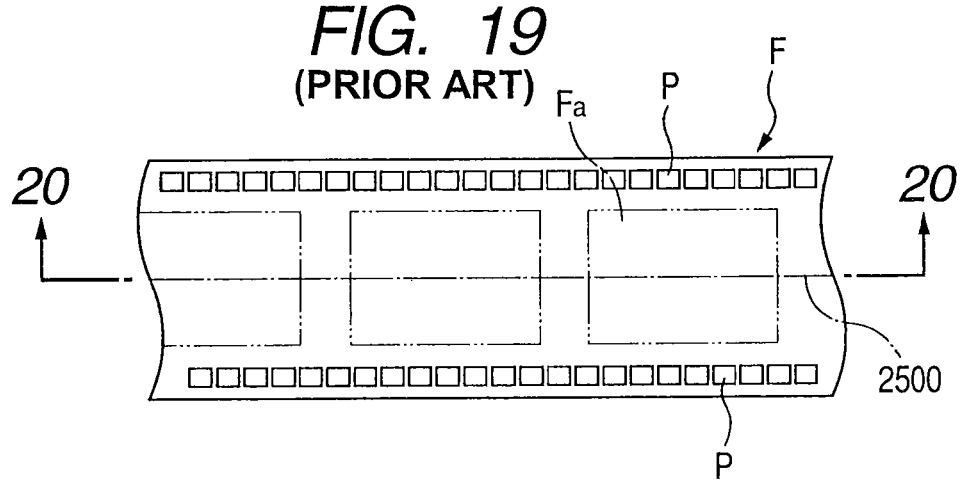
FIG. 19 is an enlarged view of the film portion of FIG. 16.
Figure 20:
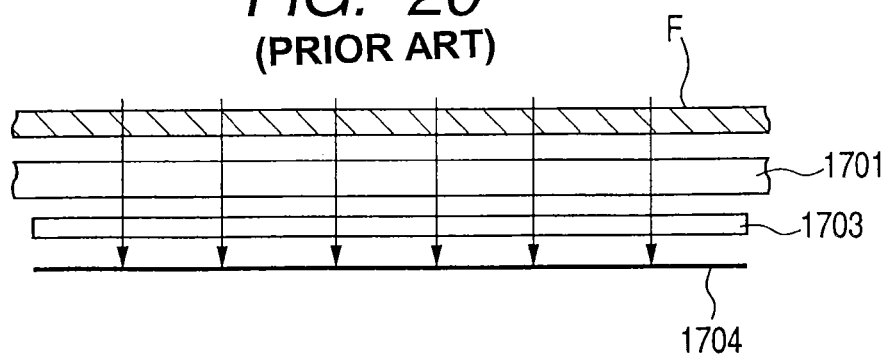
FIG. 20 is a cross-sectional view taken along the line 20-20 of FIG. 19.
Figure 21:
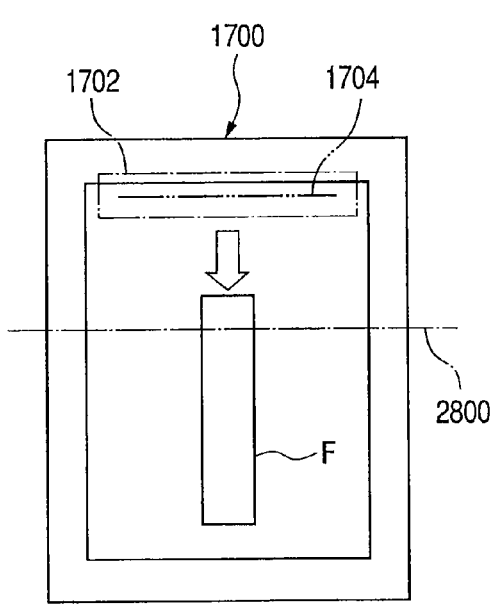
FIG. 21 is a plan view of essential portions showing a state in which in a conventional image reading apparatus, the longitudinal direction of film and the longitudinal direction of a line-shaped photoelectric conversion element are made orthogonal to each other.
Figure 22:
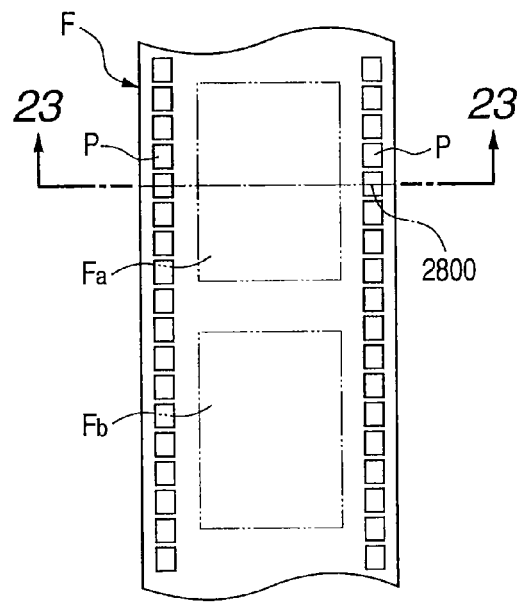
FIG. 22 is an enlarged view of the film portion of FIG. 21.
Figure 23:
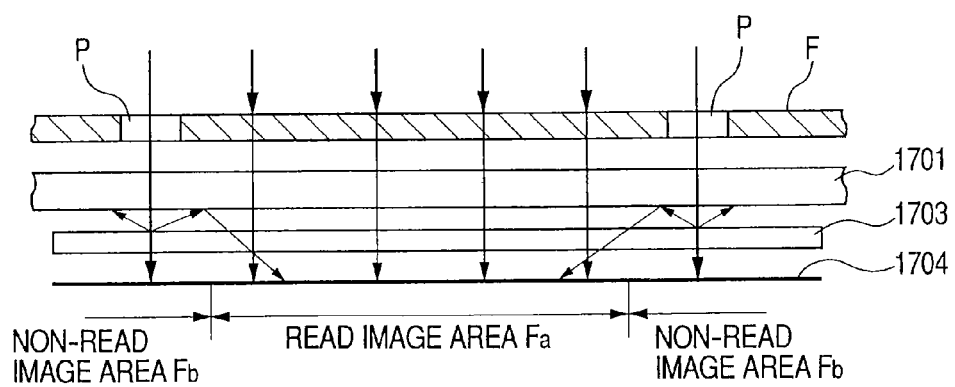
FIG. 23 is a cross-sectional view taken along the line 23-23 of FIG. 22.

A seventh embodiment shown in FIGS. 14 and 15 like the above-described fourth to sixth embodiments, is designed to cope with a case where the width L of the diffusing plate 1710 is greater than the distance between the perforations P and P on the widthwisely opposite sides of the film F (L>l), and the perforations P and P of the film F are covered with a portion of a film holder 1707, whereby the light from the light source 1709 does not directly reach the line-shaped photoelectric conversion element 1704 through the perforations P of the film F.

FIG. 14 is a plan view showing the construction of the essential portions of an image reading apparatus according to the seventh embodiment, and FIG. 15 is a cross-sectional view taken along the line 15-15 of FIG. 14.

Holding portions 1707b and 1707c are located on the widthwisely opposite sides of the film holder 1707 and are provided toward the inside so as to be opposed to each other with a spacing L5 interposed therebetween. The spacing L5 between these holding portions 1707b and 1707c, as shown in FIG. 15, is set to a value smaller than the distance l between the perforations P and P on the widthwisely opposite sides of the film F (L5<l).

The film F is held by the film holder 1707 while being inserted between the underside wall and the holding portions 1707b, 1707c of the film holder 1707, and in this state, the perforations P and P on the widthwisely opposite sides of the film F are covered with the holding portions 1707b and 1707c.

While in FIGS. 14 and 15, the opening portion 1707a of the film holder 1707 is shown as being smaller than the width of the film F, the opening portion can also be made slightly larger than the film F so that the end portions of the film F may directly contact with the original glass table 1701.

What is claimed is:
1. An image reading apparatus including:
a transparent original table for placing a transmitting original thereon;
an image reading unit for reading an image of the transmitting original through said transparent original table;
a transmitting original holder having a through-hole for positioning the transmitting original relative to said transparent original table;
an illuminating unit adapted for pressing the transmitted original positioned by the through-hole of said transmitting original holder,
a plane light source arranged in said illuminating unit, for illuminating the transmitting original,
a fitting portion, arranged on said illuminating unit, for fitting in a depression of the transmitting original holder so as to position said illuminating unit in said transmitting original holder, and
a protruding portion arranged on said illuminating unit so that, when said illuminating unit is positioned in said transmitting original holder, said protruding portion opposes a surface of said transmitting original holder on a side opposite from said transparent original table,
wherein said protruding portion is configured so that, when said illuminating unit is inserted into the through-hole at an angle such that said plane light source is not parallel to said transmitting original holder, the protruding portion contacts the surface of said transmitting original holder.

2. An image reading apparatus of claim 1, wherein said protruding portion is a cable for supplying a power source to said plane light source.

3. A transmitting original illuminating apparatus placed on a transparent original table of an image reading apparatus, including:
- a transmitting original holder having a through-hole for positioning a transmitting original relative to the transparent original table; and
- an illuminating unit adapted for pressing the transmitting original positioned by the through-hole of said original holder,
- a plane light source, arranged in said illuminating unit for illuminating the transmitting original,
- a fitting portion, arranged on said illuminating unit, for fitting in in a depression of the transmitting original holder so as to position said illuminating unit in said transmitting original holder, and
- a protruding portion arranged on said illuminating unit so that, when said illuminating unit is positioned in said transmitting original holder, said protruding portion opposes a surface of said transmitted original holder on a side opposite from the transparent original table,
- wherein said protruding portion is configured so that, when said illuminating unit is inserted into the through-hole at an angle such that said plane light source is not parallel to said transmitting original holder, the protruding portion contacts the surface of said transmitting original holder.

4. An image reading apparatus according to claim 1, wherein the transmitting original has an image area and a non-image area, the non-image area has a plurality of through-holes arranged in two rows in a lengthwise direction thereof with the image area interposed therebetween, and said plane light source of said transmitting original illuminating unit has a shape in which it illuminates the image area of the transmitting original, but does not illuminate the plurality of through-holes.

5. An image reading apparatus according to claim 4, wherein a light emitting area of said plane light source of the transmitting original illuminating unit is of an area shape which includes the image area, but does not include the through-holes.

6. An image reading apparatus according to claim 4, wherein a light emitting surface of said plane light source of said transmitting original illuminating unit has a rectangular diffusing plate, and shorter sides of said diffusing plate are smaller than a spacing between the two rows of the plurality of through-holes.

7. An image reading apparatus according to claim 4, wherein a light emitting surface of said plane light source of said transmitting original illuminating unit has a light intercepting plate formed with a hole having two parallel sides, and a spacing between said two parallel sides is smaller than a spacing between the two rows of the plurality of through-holes.

8. An image reading apparatus according to claim 7, wherein a width of the through-hole of said transmitting original holder is smaller than the spacing between the two rows of the plurality of through-holes.

* * * * *